Dec. 12, 1944.   R. MARTIN   2,365,092
SAFETY FUEL CUTOFF FOR HEATING APPLIANCES
Filed Sept. 2, 1941   4 Sheets-Sheet 1
Fig. 1.
Fig. 2.
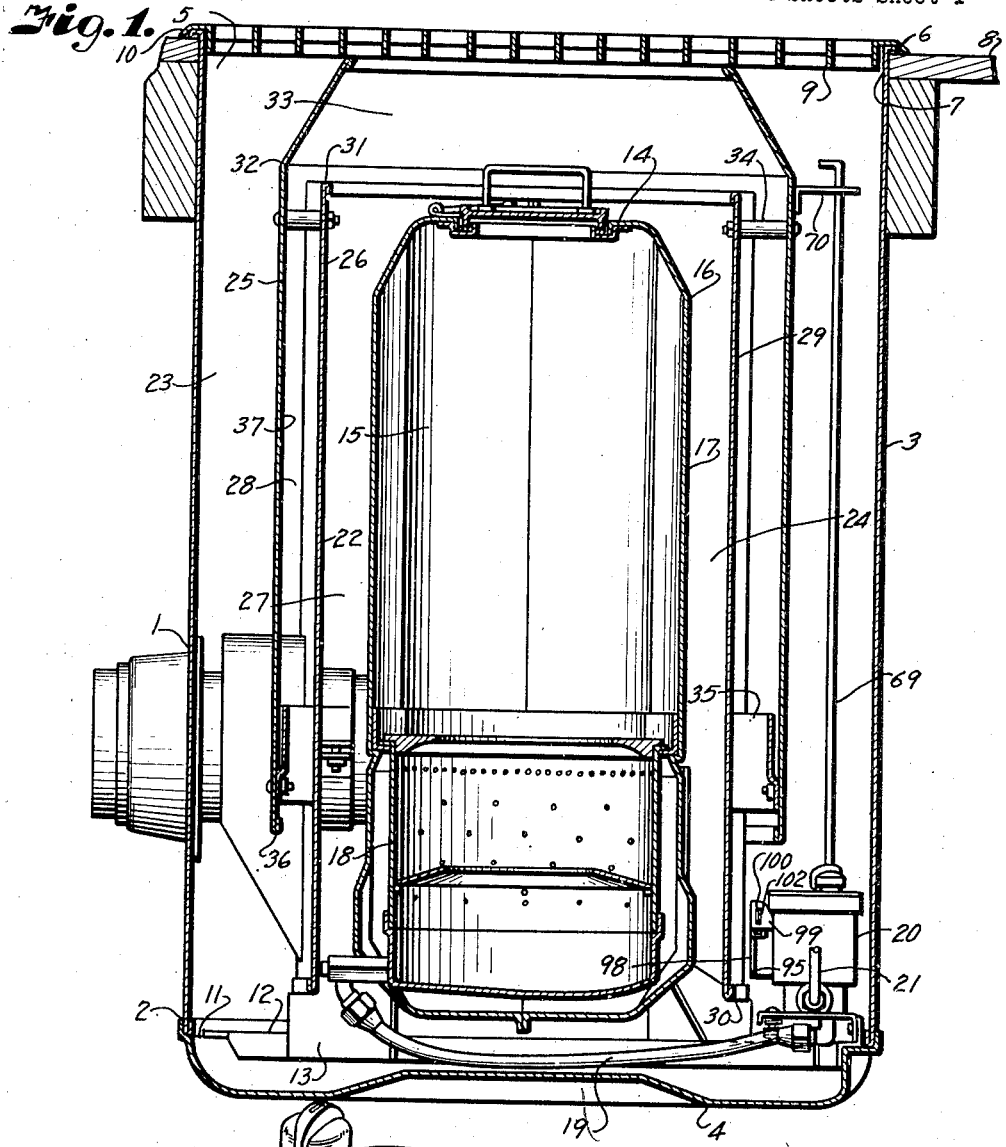
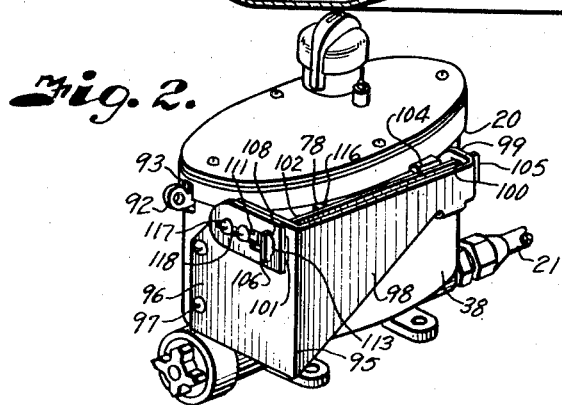
INVENTOR
Russell Martin
BY
ATTORNEY

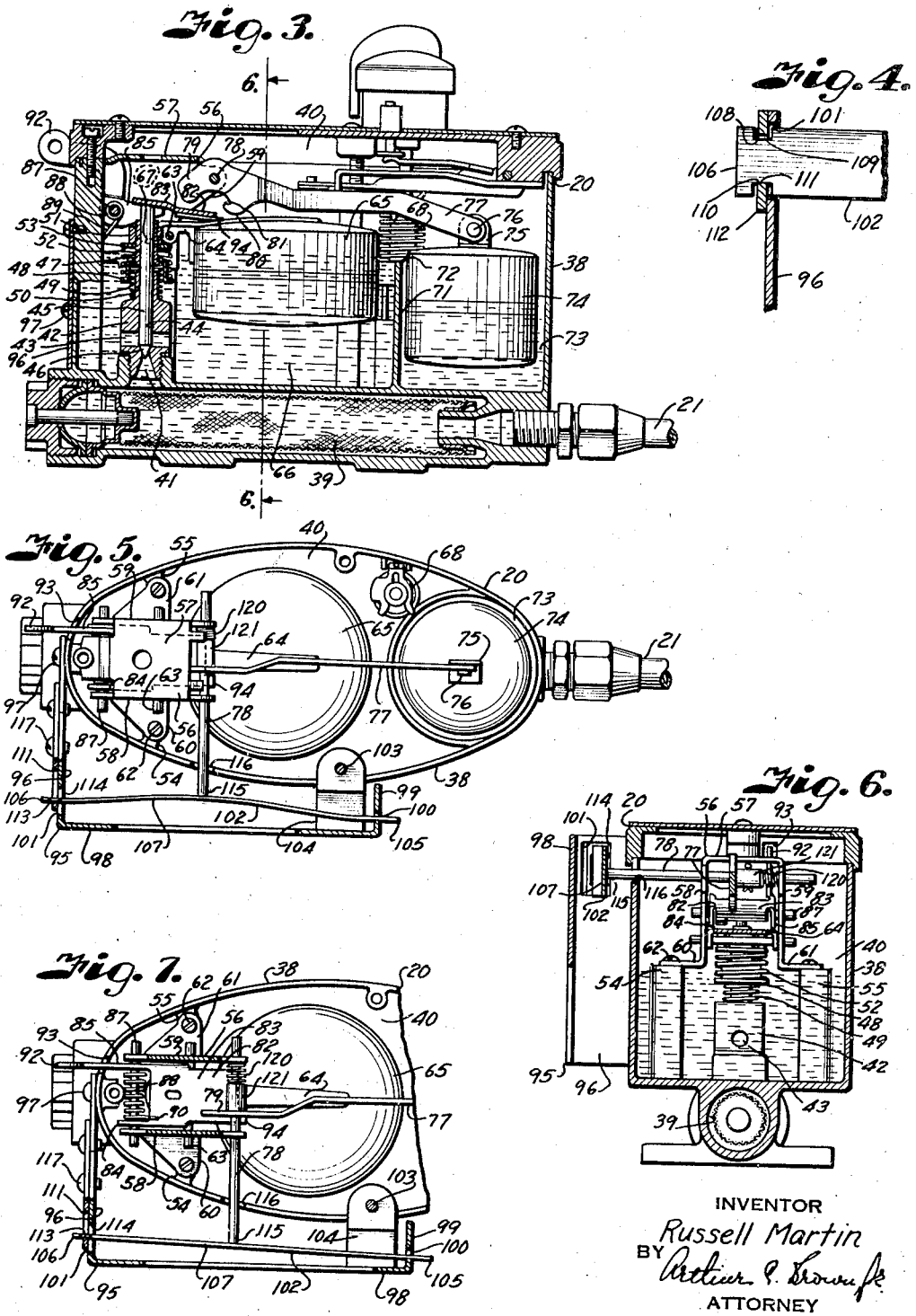

Dec. 12, 1944. R. MARTIN 2,365,092
SAFETY FUEL CUTOFF FOR HEATING APPLIANCES
Filed Sept. 2, 1941 4 Sheets-Sheet 3

INVENTOR
Russell Martin.
BY Arthur C. Brown, Jr.
ATTORNEY

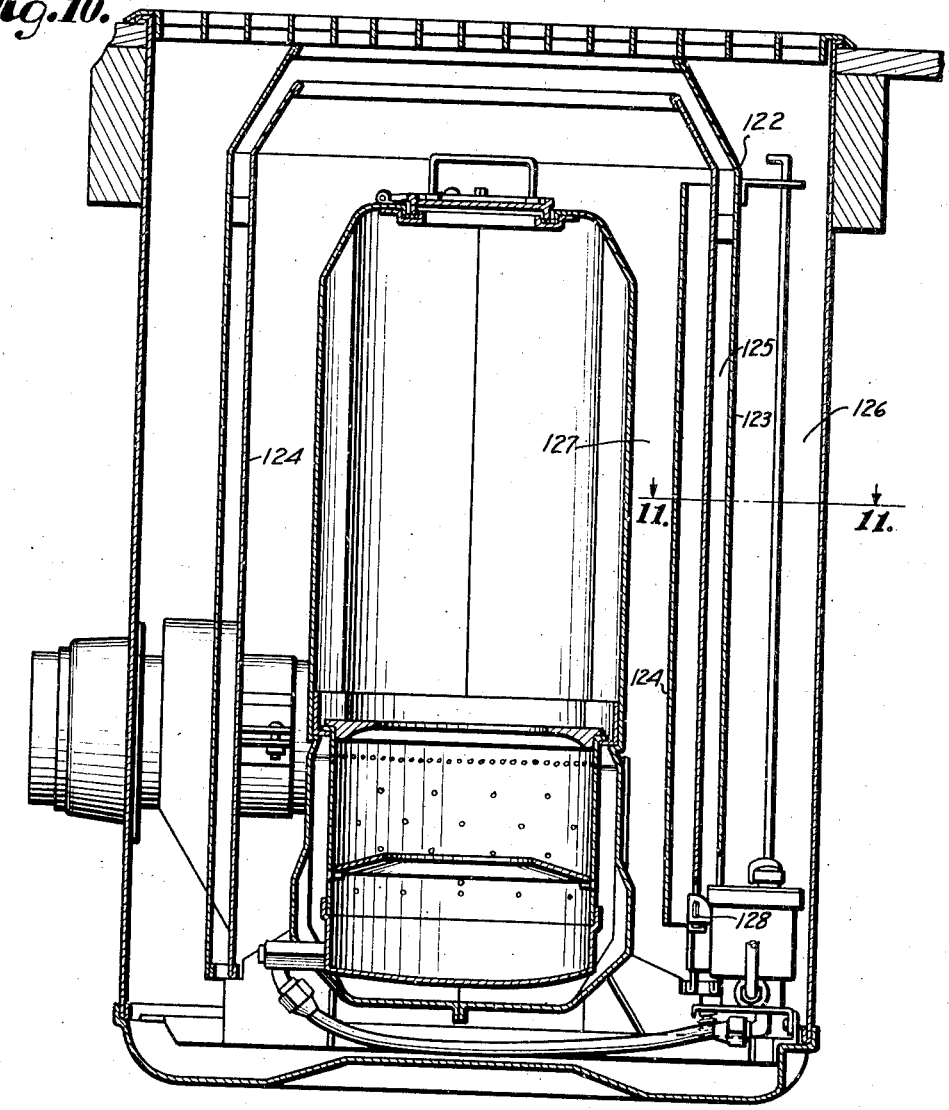
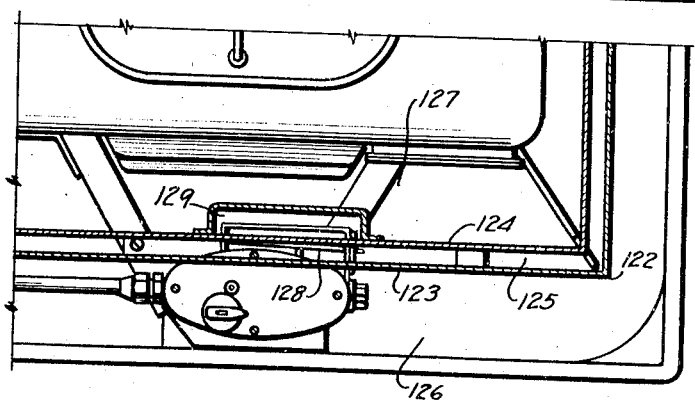

Patented Dec. 12, 1944

2,365,092

UNITED STATES PATENT OFFICE 2,365,092

SAFETY FUEL CUTOFF FOR HEATING APPLIANCES

Russell Martin, Wichita, Kans., assignor to The Coleman Lamp and Stove Company, Wichita, Kans., a corporation of Kansas Application September 2, 1941, Serial No. 409,224

4 Claims. (Cl. 126—116)

This invention relates to a safety device for heaters of the type commonly known as floor furnaces and is directed to an improved structure over that disclosed in the Ambrose D. Olds Patent No. 2,168,749 dated August 8, 1939.

A thermal limiting safety device to prevent, under certain conditions, furnace overheating has long been used. The application of thermally controlled safety devices to the more recently developed floor furnace is however comparatively new, even though this form of furnace lends itself to a simpler and more desirable form and character of structure than has hitherto been used.

One method now being used consists of a limiting valve in the fuel line actuated by a thermal element located within the hot air section near the top of the furnace. This method requires the introduction of an additional shut-off valve in the fuel line and a considerable accumulation of excess heat within the furnace to effect operation which is undesirable. This method is further undesirable because during normal operation it may cause the furnace to fluctuate continually in its burning rate, thus reducing its effective efficiency.

Another method is to locate the thermal element in the cold air section of the furnace and depend on conduction of heat from the warm air section to operate same in case the furnace becomes overheated because of obstructed air flow through the furnace. This has not been satisfactory because of slow response.

Another method similar to the above, but designed to obtain a quicker response provides for a recirculation of a portion of the warmed air from the upward flowing air of the warm section into the downward flowing air of the cold section. This recirculation of warmed air is depended upon to affect the operation of the thermal device which is located in the cold air section. This method is undesirable because it permits a considerable recirculation of warmed air into the cold air flow during normal operation. This tends to decrease the volume of air flowing through the appliances causing the unit to operate normally at higher temperature which lowers the effective efficiency of the furnace and of the heat distribution in the space being heated.

The principal object of my invention is to avoid the recirculation of warmed air through the cold air passageway thus providing a cooler location for the fuel control valve, and to provide a furnace structure that will cause a quicker and more substantial change of temperature to effect quicker response of a thermal element to limit the flow of fuel to the burner in case the normal circulation of air through the furnace is restricted by any unusual obstruction at the register through which cool air enters and warm air is discharged.

Another object is to provide a furnace structure with a secondary updraft section of warm air in normal operation and having a reverse circulation of hotter air in the event of obstruction to the air flow at the grill, thus providing a rapid temperature change to quickly actuate a thermal control element located at a point in the reverse flow of hotter air.

Another object of this invention is to provide a cooler location for the metering fuel control valve of an oil burning floor furnace, which location is adjacent the reverse hot air flow in the event of register or grill obstruction, thus permitting the combination of a thermal element with said metering valve to limit flow of fuel to the burner.

Another object of this invention is to utilize the safety cut-off fuel valve, which is designed to prevent excess fuel accumulation, and which is a part of the fuel supply valve unit.

Another object of this invention is to locate the thermal control in a normally cool zone, which zone becomes quickly heated by a reverse air flow caused by obstructing the normal air flow at the register so that the thermal control quickly limits flow of fuel to the burner to prevent unsafe rise of temperature at the grill.

Other objects of this invention are to provide a structure simple and inexpensive to manufacture; and to secure quick positive action of the shut-off valve by long connections between the thermal elements and the cut-off valve.

A further object of the invention is to provide a safety device adapted for use in connection with the type of floor furnace employing a heat transformer described in my copending application, Serial No. 386,595, filed April 3, 1941.

In accomplishing these and other objects of the invention, as hereinafter pointed out, I have provided improved structure, the preferred forms of which are illustrated in the accompanying drawings, wherein:

Fig. 1 is a vertical section through a floor furnace of the type illustrated in my above mentioned copending application equipped with a safety mechanism embodying the features of the present invention.

Fig. 2 is a perspective view of the constant level and control valve of the furnace equipped with a thermo-operated element arranged in accordance with the present invention.

Fig. 3 is a longitudinal section through the control valve showing the trip released and the fuel supply valve closed.

Fig. 4 is a fragmentary view of the thermoelement, particularly illustrating the adjustable support for one end thereof.

Fig. 5 is a plan view of the constant level and control valve with the cover removed and showing the safety mechanism in partial section to better illustrate mounting of the thermoelement, the thermoelement being shown as actuating the trip mechanism.

Fig. 6 is a cross-section on the line 6—6 of Fig. 3.

Fig. 7 is a partial plan view of the constant level and control valve showing the trip in set position.

Fig. 10 is a vertical section through a furnace showing a modification of the invention.

Fig. 11 is a partial horizontal section through the furnace shown in Fig. 10, and taken on the line 11—11.

Figure 8:
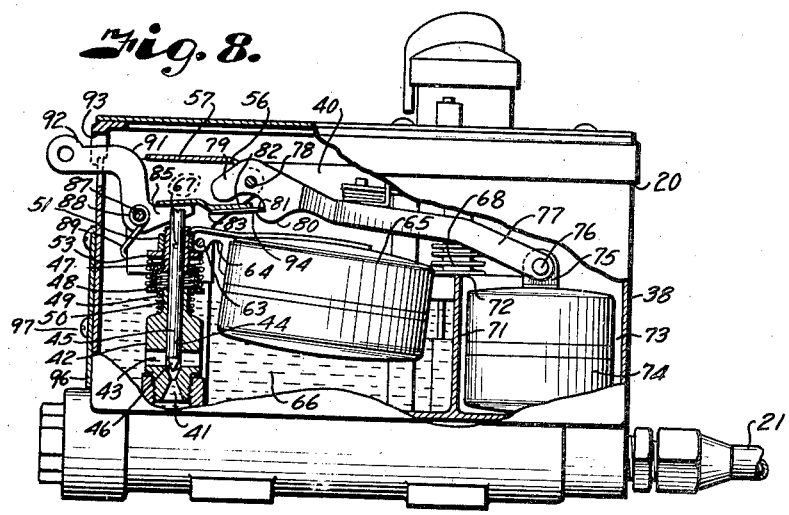
Fig. 8 is a side elevational view of the constant level and control valve, part of the wall being broken away to illustrate position of the parts when the trip is set.

Referring more in detail to the drawings:

1 designates a floor furnace including a casing 2 which is of substantially rectangular shape and includes vertical walls 3, a bottom 4, and an open top 5. The walls 3 have laterally extending flanges 6 at the upper edges for suspendingly supporting the casing within an opening 7 of a floor 8. The open top of the casing, however, is covered with a grill 9 having a marginal flange 10 engaging over the flanges 6 so that the upper surface thereof is located at substantially the level of the floor 8.

Supported on suitable ledges 11 in the bottom 4 is a frame 12, carrying brackets 13 supporting a heater and burner unit 14 substantially in the center of the casing and with the lower end spaced above the bottom 4. In the illustrated instance the heater unit includes a combustion chamber 15, having walls 16 forming heat radiating surfaces 17. Supported at the bottom of the combustion chamber is a burner or fire-pot 18 having connection through a pipe 19 with a constant level and control valve 20 which is supported on the frame 12 adjacent one of the side walls 3 of the casing 2. The constant level valve 20 is connected through a pipe 21 with a source of liquid fuel supply, whereby fuel is supplied to the burner unit under control of the valve 20, as later described. Supported on the brackets 13 is an inner jacket 22 having the walls thereof spaced inwardly of the corresponding walls of the outer casing to provide a cold air section in the form of outer downdraft passages 23 and an air heating space 24 containing the burner and heater unit.

When the furnace is in operation, cool air from the room moves downwardly through the marginal portions of the grill and through the downdraft passages 23, under the lower edges of the jacket, and upwardly in heating relation with the walls of the combustion chamber, the heated air being discharged through the central portion of the grill.

As disclosed in my copending application, the hot gases resulting from combustion of the fuel circulate over the inner surfaces of the combustion chamber to heat the walls 16 thereof. Some of the heat is carried away from the walls of the heater unit by the upwardly moving stream of air, but a large portion of the heat radiates through the upwardly moving stream of air and means is provided to absorb the radiated heat so as to avoid heating of the downwardly moving stream of relatively cool air. This is effected by forming the jacket 22 of an inner casing 25 and a heat transformer 26 which surrounds the heating unit. The walls of the heat transformer are spaced inwardly of the walls of the casing 25 and divides the air heating space 24 into a primary hot air section consisting of passageways 27 and a secondary warm air section consisting of passageways 28. These sections are interconnected at their upper and lower ends and with the cold air section at their lower ends as hereinafter described and in normal operation the air movement in both the primary and secondary sections is upward with the cool air flowing into each at the lower ends.

The transformer 26 includes vertical walls 29 having their lower edges 30 resting upon the brackets 13 and their upper edges 31 terminate short of the walls 32 of the jacket to provide a material air space 33 under the grill which connects the upper ends of the primary passageways. The portions of the walls 32 which extend above the upper edges of the transformer walls slope inwardly, as shown in Fig. 1. The outer member 25 of the jacket is carried by the member 26 by means of spacing brackets 34 and 35 and the lower edges 36 terminate above the lower edges 30 of the member 26 to assure flow of air from the downdraft passageways 23 through the secondary updraft passageways 28, thereby providing a positive division of the air into the primary and secondary air streams, as shown by the arrows in Fig. 1. The transformer walls are thus located in path of the heat radiated from the heat unit and, being formed of material having high heat absorbing properties, absorb the radiated heat and prevent its absorption by the outer member 25 of the inner jacket. In the present instance, the outer member 25 of the inner jacket is preferably formed of a heat reflecting material having a shiny inner surface 37 to reflect any heat that is reradiated from the transformer walls. This arrangement is highly satisfactory and provides a more efficient and higher velocity air circulation and results in a cooler floor grill. However, it may happen that a rug or other obstruction may be accidentally placed over the grill so that the circulation is obstructed, interfering with normal flow of air through the furnace. In that event the hot, lighter air in the primary passage and the relatively cool and heavier air in the secondary passage tend to equalize pressures, thus setting up a circulation between the two normally updraft passages. This causes reversal of air flow in the secondary passage, bringing down hotter air from the primary passage to actuate a thermostat which is utilized for effecting shut off of the fuel supply, as now to be described.

Since the constant level and control valve includes a safety shut-off valve 20 and since this valve is located in the cool air moving through the downdraft passages 23 and into the secondary updraft passages 24 and 28, I provide a thermostatic element which is supported in the path of the cool air and under the secondary updraft passageway adjacent the control and constant level valve as shown in Fig. 1. In this position the thermal element remains inoperative as long as the furnace is operating under normal temperatures but whenever the normal flow of air is obstructed and a reverse circulation is effected downward through the secondary passageways the down flow of hot air is brought into direct contact with the thermostatic element to assure actuation thereof for shutting off flow of fuel. Thus the fuel supply is suspended when the downwardly directed hot air strikes the thermal element and the fuel supply will remain shut off until such a time that the thermostat cools down and the valve is reset.

The valve 20 includes a casing 38 having a strainer chamber 39 on the bottom thereof to which the fuel supply pipe 21 is connected. Formed in the casing above the strainer chamber is a float chamber 40 having connection with the strainer chamber 39 through a port 41. The port 41 is formed in a fitting 42 threaded in a boss at the bottom of the casing and has lateral outlets 43 to the float chamber. Reciprocable in an axial bore 44 of the fitting is a valve stem 45 having a conical end 46 to engage a seat encircling the port 41. The upper end of the valve stem carries an externally threaded sleeve 47 that is fixed thereon. Carried by the lower end of the sleeve 47 is a spring cap 48 seating the upper end of a coil spring 49 which encircles a neck 50 of the fitting 42 and has its lower end bearing against a shoulder on the fitting to retain the valve in normally open position. The spring 49 is relatively light in action and is only of sufficient strength to support the valve stem. Threaded on the sleeve 47 is a collar 51 retained in adjusted position by a coil spring 52 having one end bearing against a flange on the spring cap 48 and its opposite end bearing against a washer 53 engaging against the under side of the collar 51 as shown in Fig. 3.

Formed in the casing, on the respective sides of the valve fitting 42, are ribs 54 and 55 and supported thereon is a yoke-shaped bracket 56 comprising a transverse plate portion 57, spaced vertical plate portions 58—59, and foot portions 60—61 engaging the upper ends of the ribs and secured thereto by suitable fastening devices 62. Carried by the side plate portions 58 and 59 of the yoke-shaped bracket, at a point adjacent the collar 51, is a shaft 63 pivotally mounting the arm 64 of a float 65 that is operable in the float chamber responsive to the level of fuel 66 and which has a tongue portion 67 engaging the collar 51 so that when the float rises to the level of the liquid to be carried in the float chamber the tongue engages the collar and moves the valve stem toward closed position for throttling inlet of fuel according to the rate at which it is metered to the burner pot under setting of a regulating valve 68 which is located within the casing and has connection with the pipe 19. The regulating valve is manually adjusted by a stem 69 extending upwardly in the downdraft passageway and having its upper end journalled in a bracket 70 projecting from the side of the inner jacket as shown in Fig. 1.

With the structure thus far described, it is obvious that the float will maintain a given level of fuel in the float chamber to provide a substantially uniform hydrostatic head of liquid fuel to effect control of fuel flow to the burner with the metering valve.

The constant level and control valve has a safety mechanism to shut off the oil flow in case the oil in the constant level float chamber should, for any cause, rise above a predetermined level, as now to be described. Extending transversely across the float chamber and cooperating with the end thereof opposite the inlet valve is a partition 71 terminating a slight distance above the maximum liquid level to be carried in the float chamber so as to form a weir 72 for overflow of surplus fuel and to provide an overflow chamber 73. Operable in the overflow chamber 73 is a trip float 74 conforming in shape to the overflow chamber and of substantially the same size thereof so that a minimum amount of overflow liquid will effect operation of the trip float. The float 74 has an ear 75 pivotally connected by a pin 76 with a lever 77. The lever 77 extends over the top of the float 65 and is fixed on a cross-shaft 78 having its ends supported in the side plate portions 58 and 59 of the yoke-shaped bracket previously described. The lever 77 has an arm 79 on the side of the shaft 78 opposite the trip float 74 and formed on the lever at the opposite side of the shaft is a hook 80 having a shoulder 81 to be engaged by a trip 82.

Figure 9:
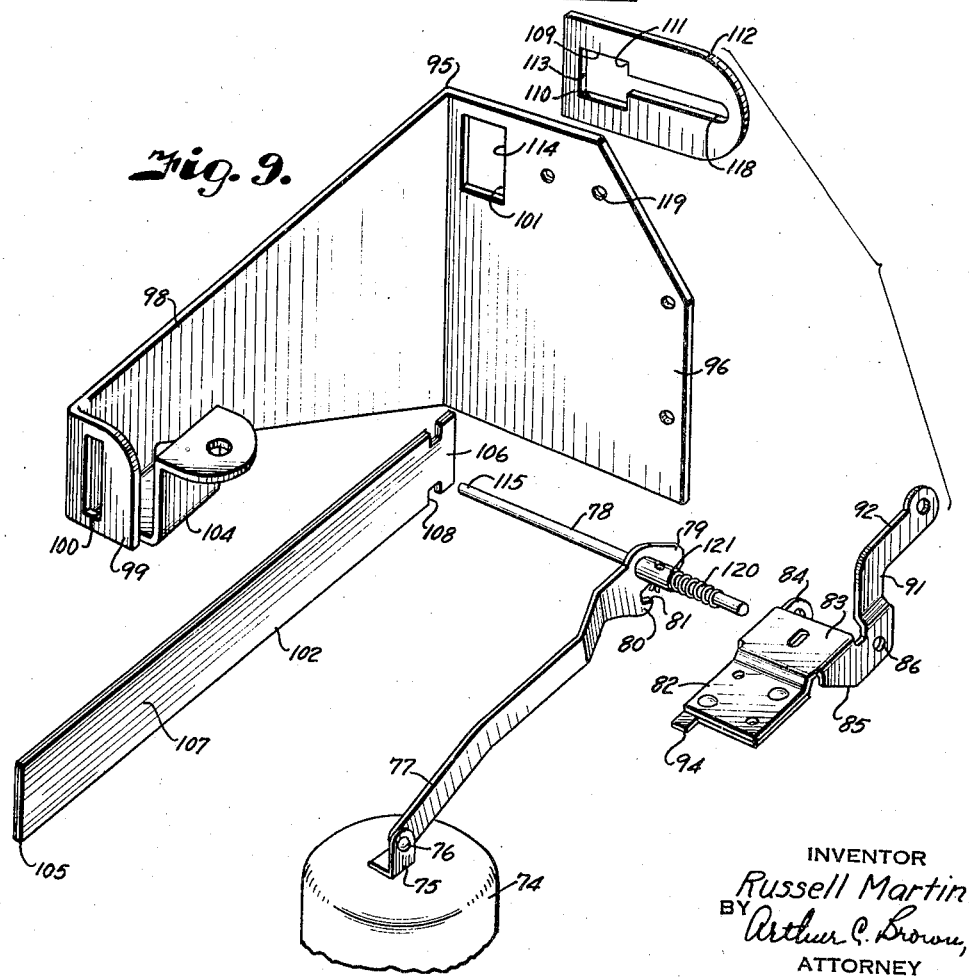
Fig. 9 is an enlarged perspective view of the parts of the safety mechanism shown in disassembled spaced relation.

The trip 82 is best illustrated in Fig. 9, and includes a horizontal plate portion 83 having depending side flanges 84 and 85 provided with openings 86 to pivotally mount the trip on a shaft 87 which has its end journalled in the plate portions 58 and 59 of the bracket 56 on the side of the valve stem opposite the shaft 78 pivoting the float lever 77. Sleeved on the shaft 87 is a coil spring 88, having an arm 89 at one end engaging the bracket plate 59 and an arm 90 on its opposite end bearing upon the plate portion 83 of the trip, as shown in Fig. 7. Thus when the trip is disengaged from the hook 80 of the lever 77, the spring 88 acts to bring the plate portion of the trip into engagement with the upper end of the valve stem 45 and force it into engagement with its seat against action of the weaker spring 49 to shut off flow of fuel to the float chamber. In order to provide for resetting the trip, the flange 86 thereof terminates in an L-shaped lever 91, having an arm 92 extending through a slot 93 in the casing 38. When it is desired to set the trip, the lever arm 92 is depressed against action of the spring 88 to raise the plate portion of the trip from engagement with the valve stem to allow the weaker spring 49 to lift the valve stem, as shown in Fig. 8. This movement of the trip lever raises the plate portion thereof so a relatively narrow tongue 94 on the forward end thereof rises under the hook 80 and is in position to be engaged thereby when the plate portion of the trip engages the arm 79 and rocks the lever 77 to bring the hook into engagement with the tongue as shown in Fig. 8. Initial movement of the lever 77 responsive to raising of the trip depresses the trip float 74 in the overflow chamber 73 so as to displace the liquid therefrom. Upon release of the trip lever the tongue thereof will engage on the shoulder 81 and the plate portion of the trip lever will be retained from engagement with the upper end of the valve stem as shown in Fig. 8.

If for some reason the float valve should fail to operate, the liquid level will rise in the float chamber to the point where it overflows the weir 72 into the overflow chamber so that the overflow fuel acts on the trip float 74, raising the float in the overflow chamber and causing the lever 77 to rock on its supporting shaft 78 to effect release of the tongue 94 of the trip from engagement with the hook 80. The spring 88 then comes into play to force the trip lever against the upper end of the valve stem and effect positive seating thereof to shut off flow of liquid to the float chamber. The trip is readily reset by pushing on the arm 92 to again bring the tongue 94 of the trip in engagement with the hook 80 of the float arm 77. During engagement of the trip with the hook, the plate portion of the trip engages the arm 79 and rocks the lever 77 downwardly so as to displace excess liquid from the overflow chamber back into the float chamber. Upon release of the arm, the spring 88 comes into play and moves the tongue of the trip into engagement with the hook so that the trip is again supported and ready to be tripped in case the valve should fail to operate.

I also use the safety trip for suspending the fuel supply in case an article should be accidently placed over the grill, as now to be described. Fixed to the exterior of the constant level and control valve casing is a bracket 95 including a plate portion 96 fixed to the end of the valve casing by fastening devices, such as screws 97. Extending from one edge of the plate and in spaced relation with the side wall of the casing 38 nearest the secondary updraft passageway is an arm 98 having a laterally extending ear 99 which is provided with a slot 100 cooperating with a slot-like opening 101 in the plate portion 96 to mount a thermoelement 102. The arm 98 of the bracket 97 is fixed to the casing 38 by a screw 103 extending through an extension 104 of the arm. The opening 101 is of greater width than the slot 100 to accommodate adjustment of the thermostatic element 102.

The thermostatic element comprises a bimetal blade arranged substantially horizontally with the ends 105 and 106 projecting through the openings 100 and 101 and so that the flat sides 107 thereof are in position to be wiped by the air moving downwardly through the downdraft passageway when the furnace is in normal operation and by the reverse flow of the air through the secondary passageway in case the outlet to the furnace has been blocked by a rug or the like placed on the grill. The end 106 of the thermostat blade extending through the opening 101 is notched on the respective side edges thereof as indicated at 108, which notches are within the upper and lower edges 109 and 110 of an opening 111 in an adjusting plate 112. The opening 111 substantially conforms in width to the opening 101 and the plate 112 is mounted on the plate 96 so that the edge 113 of the opening 111 cooperates with the edge 114 of the opening 101 in limiting lateral movement of the notched end of the bi-metal blade and to adjust the blade relatively to the terminal end 115 of the shaft 78, which end projects through a notch 116 in a side of the casing as shown in Fig. 5. The plate 112 is adjustably supported by fastening devices 117 extending through a slot 118 in the plate 112 and into threaded openings 119 of the plate portion 96 of the bracket 95.

The shaft 78 is retained in projected position so as to keep the hook 80 thereof in alignment with the tongue 94 by a coil spring 120 sleeved on the shaft and having one end engaging the hub 121 of the float lever 77 and its other end engaging against the plate portion 59 of the yoke-like bracket 56. The shaft is thus yieldingly supported in projected position so that the end thereof is in position to be engaged by the thermostat blade when the blade is heated responsive to reverse circulation of air in the secondary draft passageway. When this occurs, the thermostat bows in the direction of the shaft, as shown in Fig. 5, to shift the shaft so as to carry the hook portion 80 of the float lever 77 out of engagement with the tongue 94, whereupon the spring 88 comes into play to cause the trip to move into engagement with the valve stem to seat the valve and interrupt flow of fuel in the same manner as when the flow is interrupted responsive to overflow of the fuel into the overflow chamber. When the thermostat blade cools, the spring 120 returns the shaft 78 to reposition the hook of the float lever relatively to the tongue 94. The tongue 94 can then be reengaged with the hook to set the trip by pressing on the arm 92.

Assuming that the furnace is in normal operation, air from the room moves downwardly through the marginal edges of the grill 9, through the downdraft passages 23, where a portion thereof is directed upwardly through the secondary passages 28 and the rest through the primary updraft passageways 27. The air moving through the primary passageways 27 picks up heat through contact with the hot surfaces of the combustion chamber 15 and the radiated heat which has been absorbed by the transformer 26. The heat absorbed by the transformer 26 also heats the air passing through the secondary passages 28 which are relatively large to provide for unrestricted flow of air so that the outer walls 32 of the jacket are kept in relatively cool condition and avoids heating of the air in the downdraft passages. Therefore circulation of the air is maintained at higher velocity and the furnace operates more efficiently and with a lower grill temperature.

Assuming that a rug is accidently thrown over the top of the grill 9 to block or partially block flow of air therethrough, the hot air in the updraft passageway 24 is diverted laterally so that it circulates downwardly through the secondary passageways and the hot air contacting the thermoelement 102 produces warping thereof in the direction of the shaft 78 to effect shifting of the shaft 78 in a direction to move the hook 80 of the float lever 77 out of engagement with the tongue 94 on the trip. When this occurs, the spring 88 of the trip 82 forces the plate portion of the trip into seating engagement with the valve stem 45 to stop flow of fuel to the burner pot 18. When the obstruction is removed and normal circulation is again set up in the furnace so that the thermoelement 102 cools, the spring 120 returns the shaft 78 into position so that the hook 80 is in alignment with the tongue 94. The tongue 94 may then be engaged with the hook by pressing on the arm 92. This is readily effected by extending a suitable wire or the like through one of the openings in the grill and engaging the arm 92. The trip is then supported against action of the spring 88 so that the stem of the valve is restored for actuation by the float 65 which regulates level of liquid in the float chamber 40.

The form of the invention illustrated in Figs. 10 and 11 is substantially the same as that just described, with the exception that the inner jacket 122 is of conventional floor furnace construction. In this instance the outer wall member 123 of the jacket is provided with an inner liner 124 spaced only a sufficient distance therefrom to provide a dead air or insulating space 125 to insulate the outer downdraft passage 126 from the updraft passage 127. In this case there is little or no circulation of air between the members of the inner jacket and in order to carry out the invention the side of the liner 124 adjacent the thermoelement 128, carries an updraft flue 129 which becomes a downdraft flue in case flow of hot air is blocked from the furnace to conduct the hot air into contact with the thermoelement to effect shut-off of the fuel in the manner previously described.

From the foregoing it is obvious that I have provided a simple and inexpensive furnace structure and safety device for fluid burning heating appliances and one that is readily adapted to be used with a constant level control and safety valve associated with a heating appliance. It is also obvious that this invention may be employed to prevent the temperature rise of the constant level control and safety valve itself above a predetermined point. It is also obvious that the thermal element is located in a relatively cool location during normal operation, but which location is quickly heated in case of an obstructed air flow through the appliance, thus actuating the thermal element for limiting the temperature rise of the appliance.

What I claim and desire to secure by Letters Patent is:

1. In a floor furnace, an open top outer casing having side walls and a bottom, a grill covering said open top of the outer casing, an open top inner casing having walls spaced inwardly of corresponding walls of the outer casing for forming downdraft and primary updraft passages in communication with each other near the bottom of the casing whereby cool air to be heated moves downwardly through the downdraft passage and upwardly through the primary updraft passage, a heater unit in the primary updraft passage for heating the air in the primary updraft passage, means for supplying fuel to the heater unit, adjustable means in said fuel supply means for limiting flow of fuel to the heater unit, means cooperating with at least one of said walls of the inner casing for forming a substantially vertical secondary updraft passage in communication at its upper end with the upper portion of the primary updraft passage and at its lower end with the downdraft and primary updraft passages whereby relatively cool air from the downdraft passage moves upwardly through the secondary passage and hot air is adapted to move from the primary updraft passage downwardly through the secondary updraft passage when discharge of heated air is blocked from the updraft passage through the grill, a thermostat element adjacent to the lower end of the secondary updraft passage substantially where said secondary updraft passage communicates with the downdraft passage for contact with the cool air when the cool air moves upwardly through the secondary passage and in contact with the hot air when hot air moves downwardly through the secondary updraft passage, and an operating connection between the thermostat element and said adjustable means to cause actuation of said adjustable means for limiting flow of fuel when the thermostat element is subjected to flow of heated air moving downwardly through the secondary passage.

2. In a floor furnace, an open top outer casing having side walls and a bottom, a grill covering said open top of the outer casing, an open top inner casing having walls spaced inwardly of corresponding walls of the outer casing for forming a downdraft passage and a primary updraft passage on the respective sides of the inner casing walls, and having its lower end spaced above said bottom to provide communication between said passages near the bottom of the casing whereby cool air to be heated moves downwardly through the downdraft passage and hot air is adapted to move upwardly through the primary updraft passage, a heater unit in the primary updraft passage for heating the air in said updraft passage, means for supplying fuel to the heater unit, adjustable means in said fuel supply means for limiting flow of fuel to the heater unit, walls spaced inwardly of the walls of the inner casing and having their lower edges spaced above said bottom for forming substantially vertical secondary updraft passages in communication at their upper ends with the upper portion of the primary updraft passage and at their lower ends with the downdraft and primary updraft passages whereby relatively cool air from the downdraft passage moves upwardly through the secondary updraft passages and hot air from the primary updraft passage moves downwardly through the secondary updraft passages when discharge of heated air is blocked from the updraft passages through the grill, a thermostat element adjacent to the lower end of one of the secondary updraft passages substantially where said secondary passage communicates with the downdraft passage for contact by the cool air when the cool air moves upwardly through the secondary passages and in contact with the hot air when hot air moves downwardly through said secondary passage, and an operating connection between the thermostat element and said adjustable means to cause actuation of said adjustable means for limiting flow of fuel when the thermostat element is subjected to flow of heated air moving downwardly through said secondary passage.

3. In a floor furnace, an open top outer casing having side walls and a bottom, a grill covering said open top of the outer casing, an open top inner casing having walls spaced inwardly of corresponding walls of the outer casing for forming a downdraft passage and a primary updraft passage on the respective sides of the inner casing walls and having its lower end spaced above said bottom to provide communication between said passages near the bottom of the casing whereby cool air to be heated moves downwardly through the downdraft passage and upwardly through the primary updraft passage, a heater unit in the primary updraft passage for heating the air in said updraft passage, means for supplying fuel to the heater unit, adjustable means in said fuel supply means for limiting flow of fuel to the heater unit, walls spaced inwardly of the walls of the inner casing and having their upper and lower edges spaced below the grill and above said bottom for forming substantially vertical secondary updraft passages communicating at their upper ends with the upper portion of the primary updraft passageway and at their lower ends with the downdraft and primary updraft passages whereby relatively cool air from the downdraft passage moves upwardly through the secondary passages and hot air from the primary updraft passage is adapted to move downwardly through the secondary updraft passages when discharge of heated air is blocked from discharge through the grill, a thermostat element adjacent to the lower end of one of the secondary updraft passages substantially where said secondary passage communicates with the downdraft passage for contact by the cool air when the cool air moves upwardly through the secondary passages and to be contacted with the hot air when hot air moves downwardly through said secondary passage, and an operating connection between the thermostat element and said adjustable means to cause actuation of said adjustable means for limiting flow of fuel when the thermostat element is subjected to flow of heated air moving downwardly through said secondary passage.

4. In a floor furnace, an open top outer casing having side walls and a bottom, a grill covering said open top of the outer casing, an open top inner casing having walls spaced inwardly of corresponding walls of the outer casing for forming downdraft and primary updraft passages in communication with each other near the bottom of the casing whereby cool air to be heated moves downwardly through the downdraft passage and upwardly through the primary updraft passage, a heater unit in the primary updraft passage for heating the air in the primary updraft passage, means for supplying fuel to the heater unit, adjustable means in said fuel supply means for limiting flow of fuel to the heater unit, a duct extending substantially vertically of one of said walls of the inner casing and open at its upper end to the upper portion of the primary updraft passage and open at its lower end to the downdraft and primary updraft passages whereby relatively cool air from the downdraft passage moves upwardly through said duct and hot air from the primary updraft passage moves downwardly through said duct when discharge of heated air is blocked from the updraft passage through the grill, a thermostat element adjacent to the lower end of said duct substantially where the duct connects with the downdraft passage for contact with the cool air when the cool air moves upwardly through said duct and in contact with the hot air when hot air moves downwardly through said duct, and an operating connection between the thermostat element and said adjustable means to cause actuation of said adjustable means for limiting flow of fuel when the thermostat element is subjected to flow of heated air moving downwardly through said duct.

RUSSELL MARTIN.